Jan. 14, 1941.   G. S. EDMONSON   2,228,721
MACHINE AND PROCESS FOR MAKING LINEAR MOLDING OF SYNTHETIC PLASTIC MATERIALS
Original Filed Jan. 15, 1938    2 Sheets-Sheet 1
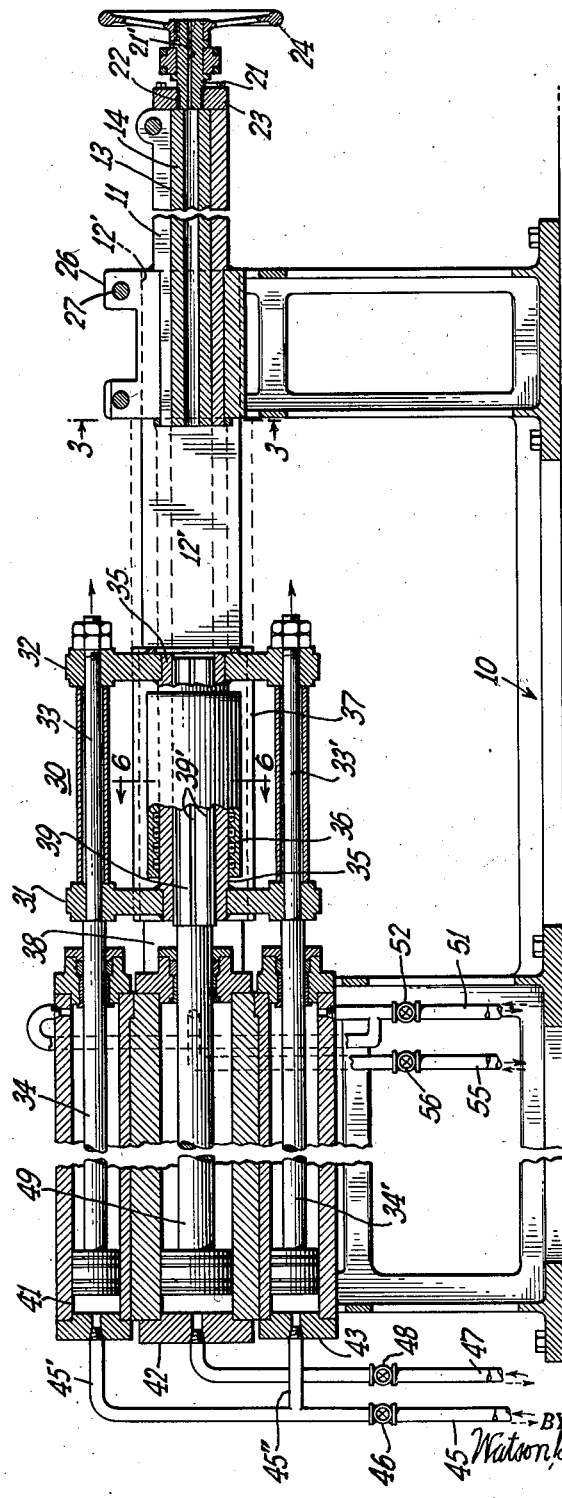
INVENTOR.
George S. Edmonson
BY Watson, Bristol, Johnson & Leavenworth
ATTORNEYS.

Jan. 14, 1941.    G. S. EDMONSON    2,228,721
MACHINE AND PROCESS FOR MAKING LINEAR MOLDING OF SYNTHETIC PLASTIC MATERIALS
Original Filed Jan. 15, 1938    2 Sheets-Sheet 2
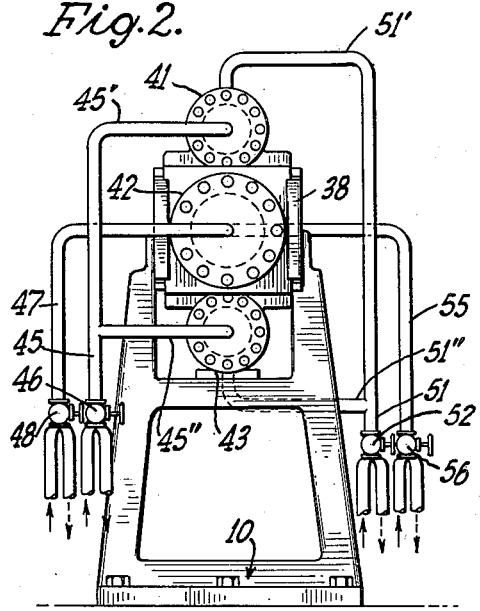
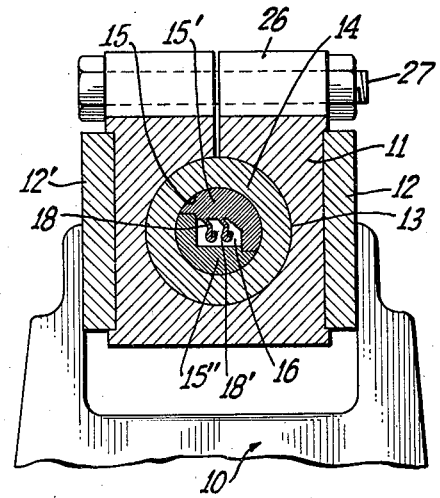
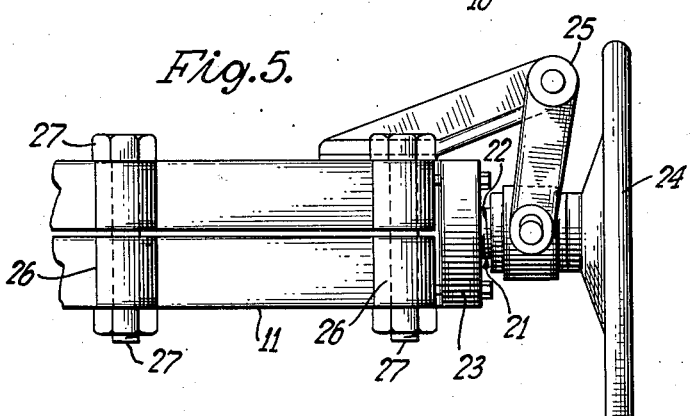
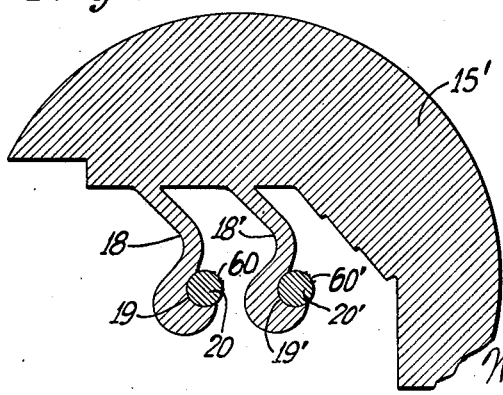
INVENTOR.
George S. Edmonson
BY Watson, Bristol, Johnson & Leavenworth
ATTORNEYS.

Patented Jan. 14, 1941

2,228,721

UNITED STATES PATENT OFFICE 2,228,721

MACHINE AND PROCESS FOR MAKING LINEAR MOLDING OF SYNTHETIC PLASTIC MATERIALS

George S. Edmonson, New York, N. Y.

Application January 15, 1938, Serial No. 185,150
Renewed June 5, 1940

5 Claims. (Cl. 18—30)

This invention relates to a machine and process for making moldings of plastic materials, particularly linearly generated moldings of a synthetic plastic material and which may serve as conduits or receptacles for electrical conductors.

The invention has for its object, generally, the provisions of a machine of the character indicated for practicing cyclically the steps of a process for making moldings of a synthetic plastic material, such as a thermo-plastic or a thermo-setting material, in a manner which imparts a linearly generated configuration.

Another object is to provide a machine adapted for making a linearly generated molding of material of the character indicated which includes means for severally practicing the step of introducing molding material into a mold chamber, and set the same.

Another object is to provide a machine of the character indicated with a mold chamber for making linearly generated moldings that is open at its ends so that it is capable of having the molding material quickly pressed into every part of the mold and set under a relatively high pressure.

Another object is to provide a mold chamber open at its end with mechanism at one end that is quickly opened and closed and is adapted to have the molded article positively and quickly ejected from such end when open.

Another object is to provide a machine of the character indicated with a pressure means adapted to generate a relatively great amount of pressure to be applied directly on the molding material in the mold chamber through an end opening.

Another object is to provide either or both of the loading means and mold chamber in machines of the character indicated with suitable heat treating elements for bringing the molding material into a desired plastic condition.

Another object is to provide a mold chamber of construction which is adapted to have either a heating or a cooling fluid circulated in heat conducting relation therewith so as to treat the material in the mold chamber and bring about a curing action.

Another object is to provide a molding machine in which interchangeable mold chambers may be used for making linearly generated articles of different kinds and sizes and of either a thermo-plastic or of a thermo-setting material.

Another object is to provide a machine having an assemblage of elements for performing the basic operations in molding a linear article which coordinates the power, pressure, time of introduction, and period of plasticity for making moldings of a thermo-setting material in a regular and expeditious manner.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which:

Fig. 1 is a view, partly in section and partly in elevation, parts being broken away, showing a machine for making linear moldings of synthetic plastic material in accordance with the invention;

Fig. 2 is an end elevation of the machine;

Fig. 3 is a sectional view taken on the line 3—3 of Fig. 1, showing details of the mold chamber;

Fig. 4 is an enlarged fragmentary sectional view showing details of a die member shown in Fig. 3 that is adapted to make channels whose cross-sections are of tortuous form;

Fig. 5 is a view showing details of one form of breech mechanism employed for quickly opening and closing one end of the mold chamber;

Fig. 6 is another sectional view taken on the line 6—6 of Fig. 1 showing details of the pressure applying piston;

Fig. 7 is a view showing a modified form of mold chamber that is adapted to apply heat during the molding process, in accordance with the invention; and Fig. 8 is a perspective view showing an ejecting column or member that has a cross-section identical with that of the molded article and is used to displace the same from the mold chamber when the breech mechanism is opened.

A machine in accordance with the present invention, comprises a combination of cooperating units that have means jointly and severally adapted for carrying out the steps of a process of molding articles of plastic material of the character indicated and imparting thereto a linearly generated configuration of substantially constant cross-section.

To this end, a molding unit is provided which has die members shaped to form a mold cavity that imparts the linear configuration desired to the molded article. These members are held in assembled relation by suitable means, for example a housing block with a removable sleeve which receives the members and holds the same together at all times during the process, since these members are not taken apart to remove the molded article. Such members when assembled provide a mold chamber with a longitudinally extending cavity that is open at the ends. The molding material is introduced through one of these ends, the other being closed. When the article is molded, it is withdrawn or ejected from the other end for which purpose it is opened. A quick opening closure for such purpose is preferably provided.

Cooperating with the open end of the mold chamber is a loading unit which includes means for introducing the molding material. Such means is preferably in the form of another sleeve that is relatively movable with respect to the housing sleeve in order that these instrumentalities may be brought into and out of loading association. Preferably associated with the loading sleeve is a heat treating element for conditioning the molding material to be introduced. It is advantageous to mount the molding unit stationarily on a suitable support and to impart motion to the loading sleeve to move it into and out of a position adjoining the housing sleeve for introducing molding material. Any suitable motor means may be provided for imparting movement to the loading sleeve, for example, one or more hydraulic rams.

The molding material, when in suitable plastic condition, is introduced into the mold chamber and pressure is applied. To apply the pressure desired, a pressure generating means is employed, which advantageously has the form of a pressure applying piston that is independently actuated by any suitable means. Such piston is arranged to work in the loading sleeve and to force the introduction of the molding material into the mold chamber. The pressure here applied is of an order particularly adapted to moldings of linearly generated configurations and is exerted and transmitted longitudinally of the molded article instead of the usual manner of exerting pressure on their faces.

Another ram, hereinafter referred to as the "main ram," is preferably the form of the independent means employed for actuating the pressure applying piston. This ram and the sleeve moving rams, hereinafter referred to as the "auxiliary rams," are advantageously assembled together and mounted as a third or ram unit on the base or frame of the machine here provided.

The quick opening closure for the mold chamber is at the end remote from the ram unit, i. e., at the end from which the ejection of the molded article takes place. Such closure advantageously has the form of a breech mechanism having a removable breech or tail block. With such means, the closure may be opened as soon as the molding is formed and ejection of the molding accomplished whether with or without metallic or other inserts. The ejecting pressure is applied by inserting an ejecting column in register with the end of the molding and in the direction of its longitudinal axis.

Referring now to the drawings, and particularly to Fig. 1, a machine is shown incorporating the above described units, arranged as three operative assemblages in horizontal alignment. To this end the units are mounted on a base 10 which may be considered as having the following sections: (1) a mold section; (2) a loading, pressure and ejecting section; and (3) a ram section. These units or sections are proportioned in accordance with the basic factors and ratios governing the steps of the process; their interrelation having been established. From a knowledge thereof, a machine of any size or capacity may be designed by simply preserving their proper values.

The mold unit or section is shown at the right hand side of Fig. 1, a cross-section thereof being shown in Fig. 3. The unit shown comprises a housing block 11, split on one side and mounted between upwardly projecting side members 12 and 12' that extend up from base 10. The housing block has a bore 13 extending longitudinally thereof and in a direction parallel to the split. In the bore 13 is disposed a removable cylinder 14 serving as the housing sleeve which has a bore 15 enclosing die members 15' and 15" which are here shown as of the same length as the mold chamber. These die members are formed as longitudinally extending elements that are separable laterally when not in the mold chamber and have an exterior diameter when assembled such as to fit tightly into the bore 15. Such fit may be such as to permit the die members to be slid into bore 15, or it may be a so-called "shrink fit"; it being contemplated to heat the sleeve or cool the dies to accomplish this latter. These die members, when assembled, enclose a cavity 16 that imparts the linearly generated configuration of substantially constant cross-sectional area to the matrix material being molded. The cross-section of exemplary die members for making a bus-carrying molding is shown in Figs. 3 and 4. To this end the form of molding shown is provided with parallel channels of tortuous entry to the buses, all in accordance with the invention disclosed in the aforesaid copending application.

The tortuosity of the parallel channels here provided is seen to be such as would ordinarily prevent the molding formed from being separated from the die members when the molding material in the mold cavity has set. The use of a mold chamber that is open at the ends avoids this, since the die members may not only be inserted and withdrawn from an end of the mold chamber but the article molded by the die members 15' and 15" may also be ejected from the mold chamber by applying pressure at one end so as to eject the molded article at the other end, the pressure being preferably applied through a rigid ejecting column or member whose exterior configuration is identical with that of the molded article. An ejecting column whose exterior is the same as the article being molded is shown in Figs. 3 and 4 is shown at 17 in Fig. 8. This form is seen to have a cross-section which includes the end faces of the bus-bars incorporated in the molding.

The tortuous channels desired are imparted to the molding by forming one or more of the die members with male elements corresponding in form and number to the channels desired. For example, that shown at 15' has two depending male elements 18 and 18' (see Fig. 4) which bend back on themselves to impart the tortuosity desired. These elements have portions comprising legs that meet at an obtuse angle, the lowermost portions each merging into an enlargement that is scooped out on one side with a lunate boundary that forms a groove; such grooves are shown at 19 and 19'. The conductors that are to be incorporated in the molding are disposed in the grooves 19 and 19' while the ends of the mold chamber are open and prior to the introduction of the molding material. In order that these conductors may be retained by the grooves 19 and 19' without liability of displacement, these grooves are formed to extend circumferentially about the conductors an arcuate distance that is somewhat more than 180°. When the mold cavity 16 is empty, electrical conductors of cylindrical cross-section, as shown at 20 and 20' are slid into grooves 19 and 19' through the end of the mold chamber remote from the ram unit until the other end is reached.

After such inserts are in place, the end of the mold chamber remote from the rams is closed by the breech closing mechanism here provided. The mechanism for this purpose is shown as comprising a block 21 that has a thread-like formation 22 on segments adapted to move into segmental open spaces on a cooperating threaded head 23 that is mounted on the remote end of the housing block 11. To afford an escape for air and the like from the mold cavity the block 21 is advantageously provided with a vent passage, as shown at 21'. The block 21 is accordingly arranged to be rotated by suitable means, such as hand wheel 24, so as to engage and disengage at will with head 23. The block 21 and wheel 24 are mounted, so as to be swung together into open position when disengaged from head 23, by means of a hinge member 25 (see Fig. 5) that is pivotally disposed on head 23. The housing block when split is, of course, provided with suitable means for causing tight engagement with the housing sleeve or cylinder 14. Such means advantageously has the form of gibs 26 on the block that have bolts 27 for drawing the sides of the block together. Since the housing sleeve may be removed from this block, it is seen that the present machine is adapted to be used with a variety of molds of different sizes and lengths.

The loading unit is mounted over the central section of base 10 and comprises a movable frame 30 consisting of headers 31 and 32 united by spacing rods 33 and 33'. These rods are preferably connected directly to the motion imparting means, which in this case comprise a pair of horizontally movable plungers 34 and 34' working in the auxiliary rams, hereinafter described. Between headers 31 and 32 is mounted a loading sleeve 35 which has a diameter adapted to fit over the adjacent end of housing sleeve 14 that is arranged to protrude slightly from the housing block. Such arrangement serves as the means for holding and introducing the molding material at the mouth of the mold cavity. On the outside of loading sleeve 35 and in thermally conducting relation therewith, is mounted a suitable heating element, for example, an electrical unit 36. Outside of the heating element and independent of it are disposed a pair of side plates 37 which are connected to and mechanically unite the headers 31 and 32. These side plates serve also as guides and slide on guide members 38 that are provided for this purpose on base 10. These guide members are preferably also arranged to serve as tension members securing the mold unit directly to the ram unit. These members, therefore, have cross-sectional areas adapted for safely transmitting the strains encountered when the rams are developing pressure, and may be formed as extensions of the members 12 and 12'. Working within the loading sleeve 35 is a pressure applying piston 39, that has one or more flutes or slots 39' (see Fig. 6) running lengthwise on its exterior. These slots supplement the passage 21' and provide additional means for venting the mold chamber.

The ram unit comprises a group of horizontally disposed ram cylinders, as shown at the left hand side of Fig. 1. The ram cylinders of this group are denoted respectively 41, 42 and 43 and are arranged with axes parallel one above the other, as shown in Fig. 2; the unit being mounted on base 10. The rams at 41 and 43 comprise the auxiliary rams, while that at 42 comprises the main ram. A line 45 having branches 45' and 45'' supplies working fluid under pressure to cylinders 41 and 43. This fluid is arranged to actuate the plungers 34 and 34' and move them simultaneously to move the frame 30 with the loading sleeve 35. A suitable valve, for example, a three-way valve as shown at 46 in the line 45, controls the admission and discharge of pressure fluid to these cylinders. A similar line 47 controlled by a three-way valve 48 controls the admission and discharge of pressure fluid for the cylinder 42. This latter has a plunger 49 that is mechanicaly connected to the pressure applying piston 39.

The plungers 34, 34' and 49 are preferably double acting and for this purpose their cylinders, namely, those at 41, 42 and 43 respectively, have additional supply lines leading to the working space in front of the plungers. Accordingly, a line 51 having branches 51' and 51'' controlled by a valve 52 communicates with the other end of cylinders 41 and 43. From the arrangement shown, it is seen that the pressure fluid supplied by the line 51 operates on a less effective area of the plungers 34 and 34' than that supplied through the line 45. In like manner, a line 55 controlled by valve 56 supplies pressure fluid to the other end of cylinder 42 which, likewise, operates on a less effective area than that from the line 47. By this arrangement the frame 30 with loading sleeve 35 may at will be quickly and accurately moved from retracted position into loading position against the end of the mold chamber or vice versa, or to any intermediate position. When the frame 30 is moved, the plunger 49, however, may remain stationary and vice versa. The molding material to be introduced is placed in the loading sleeve 35 as it is moved from the completely open or retracted position to the loading or closed position when it fits over the end of housing sleeve 35. This is readily accomplished by having the molding material in the form of tablets whose diameter is a little less than that of the interior of sleeve 35 and of suitable number or length to give a desired charge by weight. Such tablets may be placed in the sleeve in the space made vacant by the piston 39 as the loading sleeve moves into closed position. Suitable means for placing the tablets in the sleeve as it moves into position may be provided if desired. The heating element being in operation, the loading sleeve quickly plasticises the molding material when placed therein and the pressure applied. The steps of introducing or injecting the molding material into the mold cavity and applying pressure are practiced by actuating the plunger 49.

The die members 15' and 15'' may have any convenient form, that fits into the housing sleeve or cylinder 14. While the die members shown provide but a single cavity, obviously a multicavity set of die members may be employed, so long as the cavity or cavities extend longitudinally and are open at the ends. The cylinder 14 while shown as of continuous form, however, may be split longitudinally at one side. In this form, it is seen that when in place in the housing block 11, the gibs 26, if drawn together, operate also to clamp the cylinder 14 upon the die members. Such construction permits a ready change and removal of either the holding sleeve, or of the die members, or both.

The conductors 20 and 20' to be incorporated in the molding, when in the grooves 19 and 19' cannot drop out of position during the molding steps by reason of their being engaged for more than 180° of their circumference by the male elements, as pointed out above.

These conductors, although of greater thermal conductivity than the die members which are generally of steel, heat up more slowly than the die members because of their somewhat easy initial fit and consequent thermal resistance to the passage of heat. Their expansion, in consequence, also lags behind that of the die members, and compensated somewhat for their difference, copper of course, having the greater coefficient of expansion. As a result when the die members are heated to the molding temperature, i. e. a temperature of the order of 300° F., the copper busbars 20 and 20' will have a somewhat lower temperature attended with little tendency to loosen in the grooves 19 and 19'. In other words, with heating the fit of the copper tends to tighten which further insures the copper's retention by the mold.

Since the bus-bars have less than 180° of their circumference in engagement with the material of the molding, there may not be a sufficient contact arc to retain them securely in position in the molding. To overcome this, that part of the bus-bars intended for contacting the plastic material is burred as shown at 60 and 60' (see Fig. 4). This gives the surface an adhering formation that penetrates somewhat into the molding, or vice versa. This formation extends preferably the whole length of the conductor and has a circumferential width of about 160°, achieving secure anchorage of the conductor in the molded article.

Fig. 7 shows a modified form of cylinder at 64 which is adapted to serve as the housing sleeve, instead of cylinder 14. The cylinder 64 has an external diameter fitting into bore 13 of the split housing block 11 and is provided with a bore 65 for receiving and enclosing the die member or members, as the case may be. Such cylinder differs from that at 14, in that it has embedded in its exterior surface a suitable heating element, such as an electric unit 66. By this arrangement heat is applied more directly to the molding material when introduced into the mold cavity. By this arrangement also a mold chamber having a heating element is interchangeable with a chamber having no such element. It will also be understood that the element at 66 is merely an example of a more general heat treating element which may comprise a coil or conduit in heat conducting relation with the cylinder through which either a heating or a cooling agent is caused to flow. In such case the conduit equipped cylinder has suitable inlet and exit connections for the agent that is circulated. It will also be seen that a conduit for the heat treating agent may be provided by forming one or more suitable channels in the exterior portions of the die members.

By the provision of an independent main ram, a molding pressure of desired value may be had entirely independent of that had from the auxiliary rams. Such pressure can readily be given a value great enough to force the molding material into every part of the mold chamber while in plastic form. Also it is seen that the molding pressure can be maintained constant, or varied at will, while the molding material is being set or cured. The loading sleeve and the mold chamber may also be kept at a desired constant temperature or varied at will, whereby the molding operation may be carried out and completed in a desired manner.

In thermo-setting materials, for example, those sold under the trade name "Plaskon" and "Bakelite," there are limitations on the period of time to be allotted to the loading step since the material begins to set after a certain period inherent by nature. This period has been found to depend for one factor upon the mass of the material to be introduced (i. e. the time running from the instant the charge starts to plasticise to the instant it sets); such period varying from 60 seconds for a relatively small mass to 120 seconds for a relatively large mass. The speed at which the main ram is operated accordingly should be high enough to move the material from the loading sleeve into the mold chamber and start pressure upon it in not more than 60 seconds for a small mass and not more than 120 seconds for the larger mass. Such speed is achieved by having a pump for the pressure fluid of sufficient power and displacement capacity to meet the factors of time and pressure, as set forth.

In the machine shown, a ram displacement speed of about 2 inches per second is adapted to move the pressure piston through distances ordinarily encountered in commercial molding, for example a distance of 19 or 20 inches. For such rate a pressure piston of from 4 to 6 inches in diameter will introduce a charge of thermo-setting material into the mold cavity in the required period of time. Also with this machine the supply line pressure of the pressure fluid may be multiplied substantially any desirable number of times to get a desired mold chamber pressure by employing a suitable ratio of ram plunger area to pressure piston area. Ratios that range in value from 5 to 10 are readily available. For example, with a ratio of 8 and a supply line pressure of about 3,000 pounds per square inch, the pressure piston may be made to generate a pressure of about 24,000 pounds per square inch on the molding material. This is seen to give a satisfactory working margin and factor of safety, it being remembered that the usual pressure range for flat molding is from 2,000 pounds to 9,000 pounds per square inch.

To practice a cycle of steps that form a molding incorporating bus-bar, as set forth in the aforesaid copending application, one first retracts the loading sleeve 35 and the pressure piston 39 to the open position, shown in Fig. 1 of the drawings. The breech mechanism is removed by manipulating hand wheel 24, so that both ends of the mold chamber with die members in place are open. The mold cavity, having preferably been inspected to see that it is clear, is ready to have the conductors or metallic insert introduced and put in place. A pair of conductors as shown at 20 and 20', coextensive in length with that of the molding to be formed, are slid into the grooves at 19 and 19' respectively. When this insertion is accomplished, the end of the mold chamber remote from the ram unit is closed by again manipulating the hand wheel 24.

At this juncture, the heating element, such as that at 36, if not in operation, is turned on. That at 66 is also turned on if the modified form of holding sleeve be employed. The heating elements thus bring the temperatures of the operating parts to desired values and the mold cavity is ready to receive a charge of molding material.

To introduce the charge of molding material, the loading sleeve 35 is moved toward the mold unit. To achieve this valve 46 is operated to start auxiliary rams 41 and 43 moving the head 30 to the closed position. The charge of molding material is placed in the space made vacant by the piston 39 in loading sleeve 35, as the latter moves, until it seats over the end of the cylinder 14.

Main ram 42 is thereupon actuated by opening valve 48. This causes piston 39 to move forwardly and force the introduction of the molding material into the mold cavity, any air or gas in the mold cavity finding escape through the passages 21' and 39'. This introduction takes place, of course, in the period of plasticity. Where the material is a thermo-setting material the application of heat is continued until setting is completed. As the piston 39 comes to final position it generates its maximum pressure. This pressure is by Pascal's law transmitted with equal values to all parts of the mold cavity.

As the charge introduced is generally such as to exceed slightly the cubic capacity of the mold cavity, there is a slight excess of material which may be forced out through the relief passages, i. e., exuded between the loading sleeve 35 and the mold housing, or into the passages at 39'. When this exudation is noticed no increase in the pressure is practiced; instead it may be slacked off to a desired value while or until setting is permitted to take place.

When such extrusion occurs, there is back pressure in the mold chamber. This is relieved by the relief passages provided; such as slots 39' and the crevice between the sleeves. The surplus material mainly runs backwardly in the slots 39' and appears as thin splines or as a fin at the end of the molding. By establishing a suitable ratio between the area of the cross-section of the mold cavity to the combined cross-section areas of the slots, for example, a ratio of 150 to 1, then substantially 150 times as much material goes into the mold cavity as through the slots. This passage may take place until the molding material is completely displaced from the loading sleeve when ram movement ceases and the final pressure is applied to the molded article. The combined capacity of the auxiliary rams is slightly less than that of the main ram so that in the event there is too much overload on the main ram as it approaches its maximum pressure, the relief through the slots 39' being sluggish, there will be force enough to move loading sleeve 35 back slightly and afford the desired relief. An extruded fin will result which may be later cut away or otherwise cared for.

When the setting or curing of the molded article is complete the piston 39 and the loading sleeve 35 are simultaneously retracted into open position exposing an end face of the molded article. The step of ejection is now practiced. This is accomplished by inserting the ejecting column 17 between the end of piston 39 and the exposed end of the molded article, care being taken to have the configuration of the column in register with that of the exposed end, the said configuration being identical, as previously pointed out. Pressure is again generated and applied through piston 39 and the molded article ejected. This completes the cycle.

It will be noted that in the arrangement provided, the mold unit is tied in a direct line to the ram unit by the tension members 38 thereby avoiding bending moments in the base 10. Also it will be noted that since the mold proper is separable from its housing, it supplies its own resistance to ram pressure when secured in place. Such arrangements permit the use of relatively great pressures in the machine without harm and afford readily the use of molds of different sizes and various lengths interchangeably. The holding sleeve and enclosed die members may be proportioned so as to produce moldings in all standard lengths, for example, in lengths of 2, 4, 6 and/or 8 feet. Other lengths can, of course, be molded with suitably proportioned dies in the machine. Likewise, the moldings may be made with greater or less cross-sectional areas than here shown.

By the machine described above, it is seen that cooperating instrumentalities are provided for carrying out steps for making the molded article, which are the steps of a process capable of being carried out independently by hand, the mold chamber with the elongated cavity having a cross-section such as to impart the desired configuration to the molded article being the only essential piece of apparatus.

The first step of the process for molding an article with incorporated electrical conductors is to slide the conductors as shown at 20 and 20' into place in the male members of the mold chamber. One end of the mold chamber is then closed and the subsequent steps are practiced.

The second step is that of introducing the synthetic plastic material into the mold chamber. As pointed out above, this may be accomplished by the aid of a loading sleeve and interiorly working piston.

The third step of the process involves applying pressure to the material in the mold chamber while setting. The conditioning and curing of the thermoplastic, which may be also thermosetting, is practiced by heat treatment before the introduction of the material into the mold chamber and/or thereafter. It is, of course, essential that the period for introducing the molding material into the mold chamber shall be no longer than the period of plasticity of the molding material which runs from about 60 seconds for a relatively small mass to about 120 seconds for a relatively large mass.

The amount of material introduced is, of course, determined by the so-called "bulk" factor, i. e., when the material is in powdered form this factor is from two and one-half to three times that of the volume of the finished product. If the material be in tabletted form, this bulk factor may be as little as one and one-quarter times the cubic content of the finished product.

When setting has been accomplished, the step of ejecting the molded article together with its metallic conductor or conductors is practiced. This is accomplished by opening the closed end and applying an ejecting pressure to substantially the whole of an exposed end area of the article including the area of the metallic conductor or conductors. In the machine here provided, this pressure is applied from the ram unit when retracted sufficiently to admit the insertion of a thrust member 17.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a machine for molding articles of synthetic plastic material, the combination with a mold having members forming a mold cavity with a longitudinally extending passage open at the ends and adapted to receive material to be molded, of a supporting base for holding said mold in an operative position affording access to said mold cavity at its ends, a breech mechanism for closing an end of said mold cavity comprising locking and unlocking means secured on said mold at the outside end of said mold, a loading sleeve movable with respect to said base into a position closing the other end of said mold and adapted to supply a charge of molding material when in said position, hydraulically actuated means for moving said loading sleeve into and out of supplying position at the end of said mold cavity, independent hydraulically actuated means working in said loading sleeve for applying pressure at will at said other end to the molding material when introduced into said mold cavity, said latter hydraulically actuated means being structurally associated with the first-named hydraulically actuated means to provide a single operative unit, and tying members for uniting said hydraulic unit with said mold and holding the same firmly against the thrust of said unit.

2. In a machine for molding articles of synthetic plastic material, the combination with a mold unit comprising a housing block having a longitudinally extending bore, a removable housing sleeve arranged to be held in said bore, and die members tightly disposed in said housing sleeve, and forming a mold cavity with a longitudinally extending passage open at its ends and adapted to receive material to be molded; of a base for supporting said mold unit in operative position; manually operated breech-locking means mounted on said block for opening and closing one end of said mold cavity; a loading sleeve adapted to be moved with respect to said base into a position adjoining the other end of said housing sleeve for introducing a charge of molding material; a frame supporting said loading sleeve and adapted to move the same horizontally into and out of a position closing the open end of said housing sleeve; a hydraulic ram mounted on said base for moving said frame; a piston working in said loading sleeve for forcing the introduction of the molding material at said other end and applying pressure to said material; an independent hydraulic ram for actuating said pressure applying piston; said last-named ram and said first-named ram being structurally united to form a single ram unit; and tying members extending from said ram unit to said mold unit for holding the same firmly against the resultant of all pressures applied by said ram unit.

3. In a machine for molding articles of synthetic plastic material, the combination with a mold unit comprising a housing block having a longitudinally extending bore, a removable housing sleeve arranged to be held in said bore, and die members tightly disposed in said housing sleeve, and forming a mold cavity with a longitudinally extending passage open at its ends and adapted to receive material to be molded; of a base for supporting said mold unit; a manually operated breech-locking and unlocking means operatively mounted on said block at its outside end; a ram unit mounted at the other end and comprising a main ram and an auxiliary ram having plungers adapted to move toward said mold unit; a loading unit disposed between the aforesaid units and comprising a loading sleeve connected to said auxiliary ram and having a pressure applying piston moved by said main ram working therein; and tie-members connecting said ram unit to said mold unit in the line of molding tension when said rams are operating.

4. In a machine for molding articles of synthetic plastic material, the combination with a mold unit comprising a housing block having a longitudinally extending bore, a removable housing sleeve arranged to be held in said bore, and die members tightly disposed in said housing sleeve, and forming a mold cavity with a longitudinally extending passage open at its ends and adapted to receive material to be molded; of a base for supporting said mold unit; a manually operated breech-locking and unlocking means operatively mounted on said block at its outside end; a ram unit mounted at the other end and comprising a main ram and an auxiliary ram having plungers adapted to move toward said mold unit; a loading unit disposed between the aforesaid units and comprising a loading sleeve connected to said auxiliary ram and having a pressure applying piston moved by said main ram working therein; side plates on said loading unit and arranged to serve as tie-members for holding said loading unit in rigid assembly; and guide-members mechanically connecting said ram unit with said mold unit along the line of molding tension and having portions cooperating with said side plates to guide their movement.

5. The process of making rigid linear articles of a synthetic plastic material so shaped as to have a constant cross-section of a desired configuration and an internal channel containing an embedded metallic cylindrical conductor contactable from without through a longitudinal slot extending the entire length of the article and of tortuous cross-section, by the practice of steps which comprise providing a mold of die members which form a longitudinal chamber open at the ends and shaped to impart the desired configuration, and providing internally a longitudinal male member which forms the slot and channel and has a tip which embraces circumferentially more than 180° but less than 360° of the conductor to be embedded; and thereafter molding such articles therein by the cyclic practice of molding steps comprising inserting a conductor in supporting position in such male element, closing one end of the mold chamber; introducing unimpededly through the open end of the mold chamber a charge of predetermined bulk of molding material, applying molding pressure and conditioning the plastic material when fully introduced in the mold chamber, and then ejecting the article molded by opening the closed end and applying ejecting pressure to substantially the whole of an exposed end area of the article including said metallic content.

GEORGE S. EDMONSON.